United States Patent Office 2,701,244
Patented Feb. 1, 1955

2,701,244

METHOD FOR RENDERING ACRYLONITRILE POLYMERS DYE-RECEPTIVE

George E. Ham, Decatur, Ala., assignor to The Chemstrand Corporation, Decatur, Ala., a corporation of Delaware No Drawing. Application June 12, 1953,
Serial No. 361,407

16 Claims. (Cl. 260—85.5)

This invention relates to new dye-receptive polymers and fibers prepared therefrom. More specifically the invention relates to methods of converting non-dye-receptive polymers into polymers of more general purpose utility.

It is well known that polyacrylonitrile and copolymers of 85% or more of acrylonitrile and up to 15% of other monomeric substances have excellent fiber-forming properties. In general, the polymers of the prior art are not dye-receptive unless a substantial portion of a chemically reactive commonomer is present in polymeric form in the acrylonitrile polymer. Usually such chemically reactive commonomers produce a reduction in the optimum physical properties of the fibers prepared from such copolymers.

This invention has for an object the provision of a method for increasing the dye-receptivity of acrylonitrile polymers, which does not involve any sensible sacrifice in properties of the fibers or in their utility in textile applications. A further purpose of this invention is to provide a new fiber-forming acrylonitrile polymer. A still further purpose of this invention is to provide fibers of novel composition which are fully dye-receptive to acid type dyestuffs. Other purposes will appear hereinafter.

In accordance with the invention described herein, the dye-receptivity of polyacrylonitrile or copolymers of substantial proportions of acrylonitrile and minor portions of other monomers is improved by reaction of the polymers, while in solution, with a pyridinecarboxylic ester having the formula:

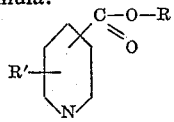

wherein R represents an alkyl radical having up to 10 carbon atoms and R' represents hydrogen or an alkyl radical having up to 3 carbon atoms, in the presence of an alkali metal alkoxide having up to 4 carbon atoms. As examples of esters falling within the scope of the above formula there may be mentioned methyl isonicotinate, methyl 3-methylisonicotinate, isopropyl isonicotinate, n-butyl isonicotinate, n-heptyl isonicotinate, n-decyl isonicotinate, methyl nicotinate, isopropyl 4-ethyl nicotinate, ethyl nicotinate, n-propyl nicotinate, n-hexyl nicotinate, methyl picolinate, ethyl 4-methylpicolinate, n-butyl picolinate, n-octyl picolinate, etc. As examples of suitable alkali metal alkoxides may be mentioned sodium methoxide, potassium ethoxide, potassium n-butoxide, sodium ethoxide, sodium propoxide, etc. The exact chemical nature of the reaction which takes place when acrylonitrile polymers are treated in accordance with this invention is not fully understood, but it is believed that it may involve the following type reaction:

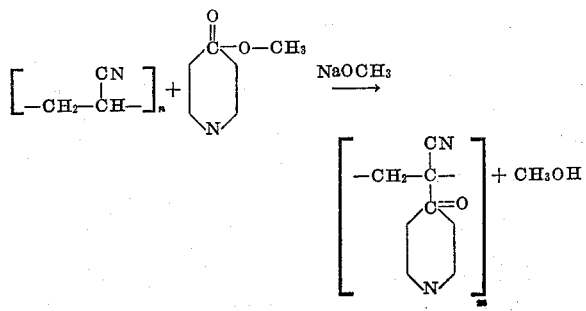

wherein $n$ is a number indicative of the extent of polymerization of the acrylonitrile, and $m$ is a number indicating the number of $n$ groups reacted. The reaction may take place on the surface of finely divided solid particles of the polymers, in suspension in a suitable fluid medium. Preferably, the polymer is dissolved in a suitable solvent, such as those from which acrylonitrile polymers are conventionally spun, for example N,N-dimethylformamide, N,N - dimethylacetamide, gamma-butyrolactone, and ethylene carbonate. Another modification of the invention is to react a surface of a finished fiber in a suitable liquid medium or with the surface swollen by action of a polyacrylonitrile solvent.

Suitable polymers for the practice of this invention are polyacrylonitrile or copolymers of at least 85 percent and preferably 90 percent of acrylonitrile and up to 15 percent of an olefinic monomomer copolymerizable therewith, for example, vinyl acetate, or other vinyl ester of a monocarboxylic acid; styrene, or other vinyl substituted aromatic hydrocarbons; alpha-methyl styrene, or other isopropenyl substituted aromatic hydrocarbons; vinyl chloride, or other vinyl halide; methyl methacrylate, or other alkyl ester of methacrylic acid; methyl acrylate or other alkyl ester of acrylic acid; dimethyl fumarate, or other dialkyl ester of fumaric acid; dimethyl maleate, or other dialkyl ester of maleic acid; vinylidene chloride, methacrylonitrile; the vinylpyridines; the various alkyl substituted vinylpyridines; and the corresponding vinyl, isopropenyl, allyl and methallyl substituted pyridines, quinolines, imidazoles, pyrazines, oxazoles, imidazolines, pyrimidines, benzimidazoles, benzoxazoles, thiazoles, benzothiazoles, pyridazines, pyrazoles, pyrroles, triazines, and other compounds containing N-heterocyclic ring structures.

The preparation of the new dye-receptive polymers is conducted by subjecting the nitrile polymer to the action of the pyridine carboxylic ester in the presence of an alkali metal alkoxide. To render the polymer dye-receptive, it is usually necessary to react from 1 to 10 percent of the nitrile groups and by the reaction to convert them into the functional radicals. To effect the desired results a substantial excess of the ester should be used, for example, from 2 to 20 percent of the stoichiometric equivalent of the total nitrile radical in the polymer. The alkoxide, which is also a critical reactant, must necessarily be used in an amount equivalent to the nitrile groups to be reacted, but a slight to substantial excess may be used to expedite the reaction. The necessary reagents and reactants are usually heated to a temperature of 80° C. to 150° C. in order to promote the reaction. The use of temperatures above this range may convert too many nitrile groups to the functional groups and give rise to secondary reactions, which are undesirable because of deleterious effects on fiber properties and because the cross-linking of the polymer in prespun condition may cause gelation to an extent that spinning becomes impracticable. The cross-linking of the polymer may also take place at temperatures in the preferred range if the reaction is conducted for too long a period of time. In the preferred practice of this invention the reaction is interrupted prior to the formation of an unspinnable gel, which state can be determined by measuring the viscosity of the polymers or polymer solutions.

The preferred practice of this invention involves the use as the reaction medium of a solvent for the fiber-forming acrylonitrile compositions. Thus, N,N-dimethylformamide, N,N-dimethylacetamide, butyrolactone, ethylene carbonate, and tris (dimethylamido) phosphate are useful solvent media for the practice of the present invention. When the polymers are converted into the dye-receptive form in the manner of this invention using a solvent medium, the fibers may be prepared by extruding the reaction medium directly through the spinning dies, or spinnerets. Under such conditions, it is generally desirable to avoid the use of a substantial excess of alkoxide due to the difficulty of removing the same from the viscous polymer. Under such conditions a larger amount of the ester may be required to promote a practicable rate of reaction.

Further details of the invention are set forth with respect to the following specific example:

*Example*

A mixture of 14 parts of a copolymer of 97 percent of acrylonitrile and 3 percent of vinyl acetate, 4.2 parts of methyl isonicotinate, 86 parts of N,N-dimethylacetamide, and 1.66 parts of sodium methoxide was heated with stirring at 125° C. for 1.25 hours. A film was cast on a glass plate and dried at 60° C. for 24 hours. The film was washed thoroughly with water and then immersed in a wool fast scarlet dyebath containing 2 percent of the dye and 10 percent of sulfuric acid, the percentages being based upon the weight of the film, and a 100:1 dyebath film ratio. The film was dyed at from 90° to 100° C. and the film absorbed a substantial portion of the dye and acquired a bright scarlet color.

Similar results are obtained when polymers of at least 85 percent acrylonitrile are treated under the same conditions with any pyridinecarboxylic ester included in the generic formula given above, in the presence of an alkali metal alkoxide.

A film of a copolymer of 97 percent acrylonitrile and 3 percent vinylacetate which was not treated with a pyridinecarboxylic ester in the presence of an alkali metal alkoxide did not absorb dye from the above-described standard dyebath.

I claim:

1. A process for increasing the dye-receptivity of acrylonitrile polymers which comprises treating a polymer of at least 85 percent acrylonitrile and up to 15 percent of other olefinic monomers, with from 2 to 20 percent of the stoichiometric equivalent of the nitrile groups of a pyridinecarboxylic ester having the formula:

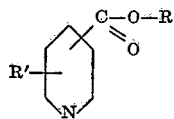

wherein R represents an alkyl radical having up to 10 carbon atoms and R' represents a member selected from the group consisting of hydrogen and alkyl radicals having up to 3 carbon atoms, in the presence of an alkali metal alkoxide having up to 4 carbon atoms, in an amount at least equivalent to the nitrile groups to be reacted, and at a temperature in the range 80° to 150° C.

2. A process for increasing the dye-receptivity of acrylonitrile polymers which comprises treating a polymer of at least 85 percent acrylonitrile and up to 15 percent of vinyl acetate, with from 2 to 20 percent of the stoichiometric equivalent of the nitrile groups of a pyridinecarboxylic ester having the formula:

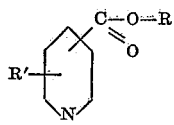

wherein R represents an alkyl radical having up to 10 carbon atoms and R' represents a member selected from the group consisting of hydrogen and alkyl radicals having up to 3 carbon atoms, in the presence of an alkali metal alkoxide having up to 4 carbon atoms, in an amount at least equivalent to the nitrile groups to be reacted, and at a temperature in the range 80° to 150° C.

3. A process for increasing the dye-receptivity of acrylonitrile polymers which comprises treating a polymer of at least 85 percent acrylonitrile and up to 15 percent of methyl acrylate, with from 2 to 20 percent of the stoichiometric equivalent of the nitrile groups of a pyridinecarboxylic ester having the formula:

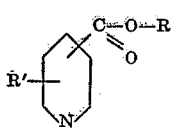

wherein R represents an alkyl radical having up to 10 carbon atoms and R' represents a member selected from the group consisting of hydrogen and alkyl radicals having up to 3 carbon atoms, in the presence of an alkali metal alkoxide having up to 4 carbon atoms in an amount at least equivalent to the nitrile groups to be reacted, and at a temperature in the range 80° to 150° C.

4. A process for increasing the dye-receptivity of acrylonitrile polymers which comprises treating a polymer of at least 85 percent acrylonitrile and up to 15 percent of methyl methacrylate, with from 2 to 20 percent of the stoichiometric equivalent of the nitrile groups of a pyridinecarboxylic ester having the formula:

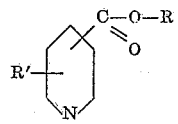

wherein R represents an alkyl radical having up to 10 carbon atoms and R' represents a member selected from the group consisting of hydrogen and alkyl radicals having up to 3 carbon atoms, in the presence of an alkali metal alkoxide having up to 4 carbon atoms, in an amount at least equivalent to the nitrile groups to be reacted, at a temperature in the range 80° to 150° C.

5. A process for increasing the dye-receptivity of acrylonitrile polymers which comprises treating a polymer of at least 85 percent acrylonitrile and up to 15 percent of vinyl chloride, with from 2 to 20 percent of the stoichiometric equivalent of the nitrile groups of a pyridinecarboxylic ester having the formula:

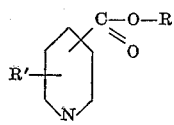

wherein R represents an alkyl radical having up to 10 carbon atoms and R' represents a member selected from the group consisting of hydrogen and alkyl radicals having up to 3 carbon atoms, in the presence of an alkali metal alkoxide having up to 4 carbon atoms, in an amount at least equivalent to the nitrile groups to be reacted, and at a temperature in the range 80° to 150° C.

6. A process for increasing the dye-receptivity of acrylonitrile polymers which comprises treating a polymer of at least 85 percent acrylonitrile and up to 15 percent of a vinyl pyridine, with from 2 to 20 percent of the stoichiometric equivalent of the nitrile groups of a pyridinecarboxylic ester having the formula:

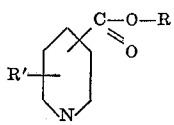

wherein R represents an alkyl radical having up to 10 carbon atoms and R' represents a member selected from the group consisting of hydrogen and alkyl radicals having up to 3 carbon atoms, in the presence of an alkali metal alkoxide having up to 4 carbon atoms, in an amount at least equivalent to the nitrile groups to be reacted, and at a temperature in the range 80° to 150° C.

7. A polymer of at least 85 percent of acrylonitrile and up to 15 percent of other olefinic monomers which has been rendered dye-receptive by reaction of from one to 10 percent of the nitrile groups with a pyridinecarboxylic ester having the formula:

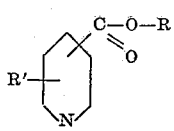

wherein R represents an alkyl radical having up to 10 carbon atoms and R' represents a member selected from the group consisting of hydrogen and alkyl radicals having up to 3 carbon atoms, in the presence of an alkali metal alkoxide having up to 4 carbon atoms, in an amount at least equivalent to the nitrile groups to be reacted, and at a temperature in the range of 80° C. to 150° C.

8. A polymer of at least 85 percent of acrylonitrile and up to 15 percent of vinyl acetate which has been rendered dye-receptive by reaction of from one to 10 percent of the nitrile groups with a pyridinecarboxylic ester having the formula:

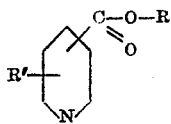

wherein R represents an alkyl radical having up to 10 carbon atoms and R' represents a member selected from the group consisting of hydrogen and alkyl radicals having up to 3 carbon atoms, in the presence of an alkali metal alkoxide having up to 4 carbon atoms in an amount at least equivalent to the nitrile groups to be reacted, and at a temperature in the range of 80° C. to 150° C.

9. A polymer of at least 85 percent of acrylonitrile and up to 15 percent of methyl acrylate which has been rendered dye-receptive by reaction of from one to 10 percent of the nitrile groups with a pyridinecarboxylic ester having the formula:

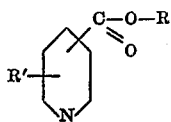

wherein R represents an alkyl radical having up to 10 carbon atoms and R' represents a member selected from the group consisting of hydrogen and alkyl radicals having up to 3 carbon atoms, in the presence of an alkali metal alkoxide having up to 4 carbon atoms in an amount at least equivalent to the nitrile groups to be reacted, and at a temperature in the range of 80° to 150° C.

10. A polymer of at least 85 percent of acrylonitrile and up to 15 percent of methyl methacrylate which has been rendered dye-receptive by reaction of from one to 10 percent of the nitrile groups with a pyridinecarboxylic ester having the formula:

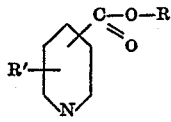

wherein R represents an alkyl radical having up to 10 carbon atoms and R' represents a member selected from the group consisting of hydrogen and alkyl radicals having up to 3 carbon atoms, in the presence of an alkali metal alkoxide having up to 4 carbon atoms in an amount at least equivalent to the nitrile groups to be reacted, and at a temperature in the range of 80° C. to 150° C.

11. A polymer of at least 85 percent of acrylonitrile and up to 15 percent of vinyl chloride which has been rendered dye-receptive by reaction of from one to 10 percent of the nitrile groups with a pyridinecarboxylic ester having the formula:

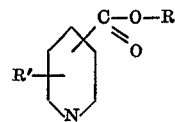

wherein R represents an alkyl radical having up to 10 carbon atoms and R' represents a member selected from the group consisting of hydrogen and alkyl radicals having up to 3 carbon atoms, in the presence of an alkali metal alkoxide having up to 4 carbon atoms, in an amount at least equivalent to the nitrile groups to be reacted, and at a temperature in the range of 80° C. to 150° C.

12. A polymer of at least 85 percent of acrylonitrile and up to 15 percent of a vinyl pyridine which has been rendered dye-receptive by reaction of from one to 10 percent of the nitrile groups with a pyridinecarboxylic ester having the formula:

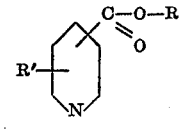

wherein R represents an alkyl radical having up to 10 carbon atoms and R' represents a member selected from the group consisting of hydrogen and alkyl radicals having up to 3 carbon atoms, in the presence of an alkali metal alkoxide having up to 4 carbon atoms, in an amount at least equivalent to the nitrile groups to be reacted, and at a temperature in the range of 80° C. to 150° C.

13. The process of claim 1 wherein the ester is methyl isonicotinate.

14. The process of claim 1 wherein the alkali metal alkoxide is sodium methoxide.

15. The polymer of claim 7 wherein the ester is methyl isonicotinate.

16. The polymer of claim 7 wherein the alkali metal alkoxide is sodium methoxide.

References Cited in the file of this patent

UNITED STATES PATENTS 2,118,864   Reppe et al. _____ May 31, 1938